United States Patent
Saad et al.

(10) Patent No.: US 9,450,858 B2
(45) Date of Patent: Sep. 20, 2016

(54) STANDBY BANDWIDTH AWARE PATH COMPUTATION

(71) Applicant: Cisco Technology, Inc., San Jose, CA (US)

(72) Inventors: Tarek Saad, Ontario (CA);
Muthurajah Sivabalan, Ontario (CA);
Rakesh Gandhi, Ontario (CA)

(73) Assignee: Cisco Technology, Inc., San Jose, CA (US)

( * ) Notice: Subject to any disclaimer, the term of this patent is extended or adjusted under 35 U.S.C. 154(b) by 109 days.

(21) Appl. No.: 14/067,023

(22) Filed: Oct. 30, 2013

(65) Prior Publication Data

US 2015/0117222 A1    Apr. 30, 2015

(51) Int. Cl.
| | |
|---|---|
| *H04L 12/721* | (2013.01) |
| *H04L 12/911* | (2013.01) |
| *H04L 12/729* | (2013.01) |
| *H04L 12/735* | (2013.01) |
| *H04L 12/707* | (2013.01) |

(52) U.S. Cl.
CPC ......... *H04L 45/125* (2013.01); *H04L 45/1283* (2013.01); *H04L 45/22* (2013.01)

(58) Field of Classification Search
CPC ............................ H04W 28/20; H04L 47/822
USPC ........................................................ 709/239
See application file for complete search history.

(56) References Cited

U.S. PATENT DOCUMENTS

| | | | |
|---|---|---|---|
| 8,477,629 B2 | 7/2013 | Vasseur et al. | |
| 8,793,334 B1* | 7/2014 | Bathija | H04L 67/1097 707/821 |
| 2003/0189919 A1* | 10/2003 | Gupta | H04L 41/044 370/351 |
| 2004/0042406 A1 | 3/2004 | Wu et al. | |
| 2004/0202158 A1* | 10/2004 | Takeno | H04L 45/02 370/389 |
| 2005/0152284 A1* | 7/2005 | Kotha et al. | 370/254 |
| 2007/0153737 A1* | 7/2007 | Singh | H04W 40/18 37/331 |
| 2008/0008178 A1* | 1/2008 | Tychon et al. | 370/392 |
| 2008/0225713 A1* | 9/2008 | Tychon et al. | 370/231 |
| 2011/0063973 A1* | 3/2011 | VenkataRaman et al. | 370/228 |
| 2012/0057466 A1 | 3/2012 | Allan et al. | |
| 2013/0336109 A1* | 12/2013 | Previdi et al. | 370/229 |
| 2015/0117222 A1* | 4/2015 | Saad | H04L 45/125 370/238 |

OTHER PUBLICATIONS

Apostolopoulos, et al., "QoS Routing Mechanisms and OSPF Extensions," Network Working Group, Request for Comments: 2676, Aug. 1999, pp. 1-50.

* cited by examiner

*Primary Examiner* — Parth Patel
*Assistant Examiner* — Jason Harley
(74) *Attorney, Agent, or Firm* — Edell, Shapiro & Finnan, LLC (57) ABSTRACT

At a first network device, a plurality of paths through a network from a source network device to a destination network device are determined. A vacant bandwidth is calculated for each of the plurality of paths. A primary path is selected from the plurality of paths based on the vacant bandwidth, and a standby path is selected from the plurality of paths based on the vacant bandwidth.

20 Claims, 7 Drawing Sheets

STANDBY BANDWIDTH AWARE PATH COMPUTATION

TECHNICAL FIELD

The present disclosure relates to computer networks, and in particular to computation and assignment of communication paths through computer networks.

BACKGROUND

A Path Computation Element (PCE) is a network element that computes communication paths, such as label switched paths, through a computer network. The computed paths are determined based on specified constraints and optimization criteria in light of the PCE's view of the network topology. A stateful PCE maintains information about the network topology as well as network resources utilized by the communication paths established in the network. A stateful PCE then uses this information to compute globally optimal paths.

One-to-one, end-to-end path protected communication paths provide a pre-signaled label switched path over a dedicated resource-disjoint alternate path to protect an associated primary label switched path. Under normal conditions, traffic is forwarded over the primary label switched path while the standby label switched path does not carry any traffic even though resources are bound to it. Upon failure of the primary label switched path, traffic is switched onto the standby label switched path to maintain traffic flow.

When establishing primary and standby label switched paths it is possible to have an imbalance in the distribution of the primary and standby paths on the network. In practice, PCEs may place multiple primary label switched paths on the same path, and the corresponding standby paths on the same disjoint path.

As failures along the primary path are usually rare in a highly available network, the primary traffic will be forwarded on the primary label switched paths for the majority of the time. Given standby label switched paths for one-to-one path protection do not carry any traffic prior to primary label switched path failures, the paths carrying more standby label switched paths become poorly utilized while paths carrying more primary label switched paths may suffer congestion at peek traffic times.

DESCRIPTION OF EXAMPLE EMBODIMENTS

Overview

Techniques are presented herein for computation and assignment of communication paths through computer networks. At a first network device, a plurality of paths through a network from a source network device to a destination network device are determined. A vacant bandwidth is calculated for each of the plurality of paths. A primary path is selected from the plurality of paths based on the vacant bandwidth, and a standby path is selected from the plurality of paths based on the vacant bandwidth.

Example Embodiments

Figure 1:
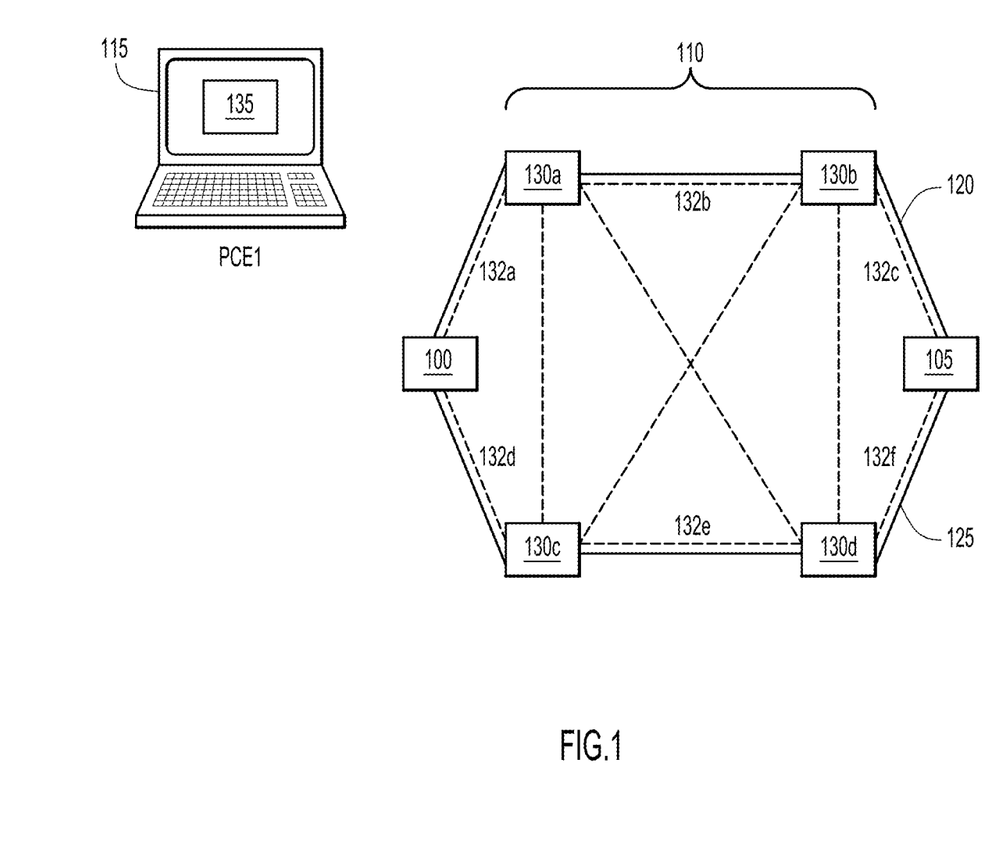
FIG. 1 illustrates an example of a network environment configured to provide standby bandwidth aware path computation.

Depicted in FIG. 1 is an ingress or source network device 100 and an egress or destination network device 105. In order for the network devices to communicate through network 110, a path computation element ("PCE") 115 may be used to determine a communication path for traffic between the source network device 100 and the destination network device 105. As illustrated in FIG. 1, a first communication tunnel is established between source network device 100 and destination network device 105 through a first communication path 120. Path 120 may be a label switched path ("LSP") which has been determined by PCE 115. According to the example of FIG. 1, PCE 115 is a stateful path computation element, meaning it is aware of the topology of network 110 as well as the traffic travelling between network nodes/devices 100, 105 and 130a-d. PCE 115 maintains this awareness for use in calculating additional communication paths.

In addition to first communication path 120, PCE 115 may also compute a second communication path 125 for communication between source network device 100 and destination network device 105. With both the first communication path 120 and the second communication path 125 calculated, one of the paths can be assigned to serve as a primary communication path and the other can be assigned to serve as a standby communication path in order to provide 1-to-1, end-to-end path protection.

As a stateful device, PCE 115 is aware of the topology of network 110 and the already established communication paths (both primary and standby) which exist over network 110. PCE 115 is also equipped with vacant bandwidth computation module 135. Specifically, vacant bandwidth computation module 135 allows PCE 115 to distinguish between resources bound to a network node which are part of a primary communication path, and resources that are bound to a node as part of standby communication. Through the use of vacant bandwidth computation module 135 and its knowledge of network topology and existing communication paths, PCE 115 is able to balance the placement of primary and standby communication paths as described below with reference to FIGS. 3 and 4. Vacant bandwidth computation module 135 also allows PCE 115 to apply a maximum filling algorithm when placing primary and standby paths in network 110 as described below with reference to FIGS. 5 and 6. Additionally, while PCE 115 is illustrated as a separate device, PCE 115 may be implemented in any network device. For example, the functionality described herein with reference to PCE 115 may also be carried out by a source device such as source device 100, a destination device such as destination device 105, or any other device connected to network 110.

For 1-to-1, end-to-end path protection, a standby LSP (i.e., protecting LSP) is established between the communicating devices, but serves only as a back-up path in case of failure of the primary LSP. Using paths 120 and 125 as an example, path 120 will serve as a primary communication path and path 125 will serve as a standby communication path. In the event of a failure of primary path 120, traffic between network device 110 and network device 105 will be transferred to path 125. Furthermore, even though no traffic will traverse path 125 under normal circumstances resources are still bound to network devices 130c and 130d to ensure that the devices are capable of handling traffic in the event of a failure of path 120.

An example of a standby communication path is path 125 that is link and node disjoint from path 120 and has been pre-signaled through network devices 130c and 130d. In FIG. 1, path 120 is link and node disjoint from path 125 because none of the intermediate network links (network links 132a, 132b and 132c) and network nodes (network devices 130a and 130b) traversed by path 120 are traversed by path 125. Similarly, path 125 is disjoint from path 120 because none of the intermediate network links (network links 132d, 132e and 132f) and network nodes (network devices 130c and 130d) traversed by path 125 are traversed by path 120. Because path 125 serves as a standby path no traffic will be sent over the path under normal conditions. Instead, path 120, which serves as the primary communication path, will handle the communication traffic.

Figure 2:
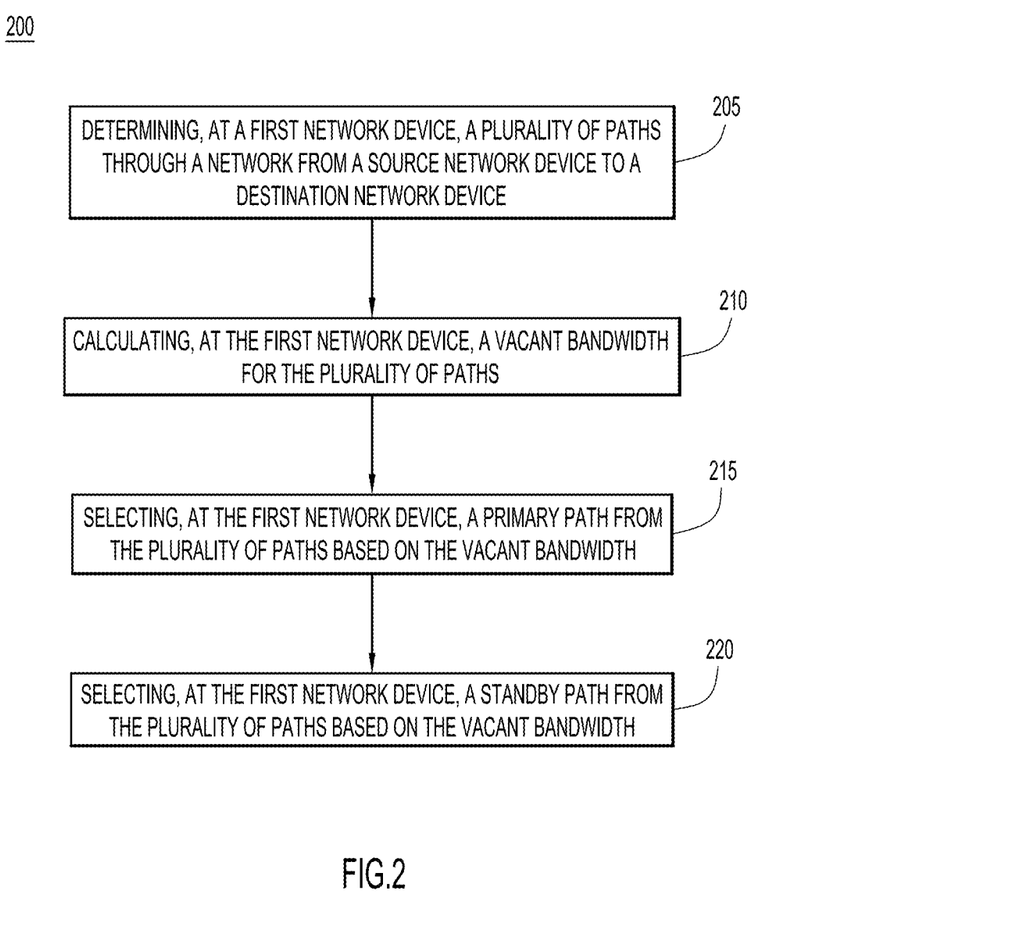
FIG. 2 is a flowchart illustrating a process for providing standby bandwidth aware path computation.

With reference now made to FIG. 2, depicted therein is a flowchart 200 illustrating a process by which primary and standby communication paths may be assigned in a network environment. The process begins in step 205 where a network device determines a plurality of paths through a network from a source device to a destination device. For example, a path computation element, such as PCE 115 of FIG. 1, may calculate a plurality of disjoint, equal cost paths from source network device 100 of FIG. 1 to destination network device 105 of FIG. 1. "Equal cost paths" are paths which will consume the same number of network and/or computational resources according to a particular metric.

In step 210, at least one vacant bandwidth is calculated for each path in the plurality of paths. The vacant bandwidth of a network link is calculated according to the following formula:

Vacant Bandwidth=Available Bandwidth+Standby Reserved Bandwidth;

The "Available Bandwidth" is the unbound bandwidth of a network link and the "Standby Reserved Bandwidth" is the bandwidth already bound to standby communication paths. This formula recognizes that the bandwidth reserved for a standby communication path, while bound to the link along the path, is unlikely to actually handle network traffic. If, for example, only the available bandwidth (i.e. the bandwidth not bound to either a primary or standby communication path) is considered, a network link which only has standby paths assigned to it may be viewed as too "busy" to handle additional paths even though the link may not be handling any traffic at all. The vacant bandwidth calculation described above, on the other hand, takes into consideration that the bandwidth bound to standby communication paths is very likely to be un-utilized.

Finally, in steps 215 and 220, a primary path is selected from the plurality of paths based on the vacant bandwidth, and a standby path is selected from the plurality of paths based on the vacant bandwidth.

Figure 3:
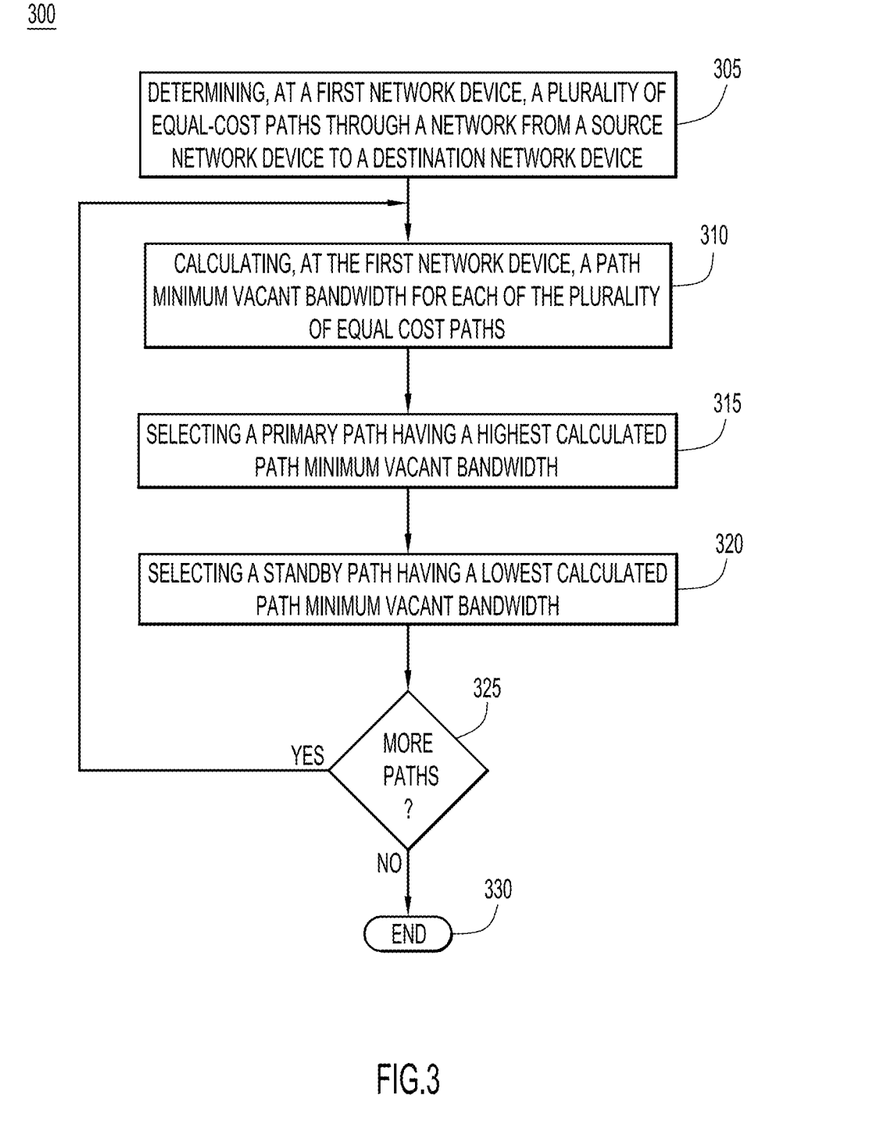
FIG. 3 is a flowchart illustrating a process in which standby bandwidth aware path computation is used to balance primary and standby paths across possible communication paths.

With reference now made to FIG. 3, depicted therein is a flowchart illustrating a process for utilizing vacant bandwidth to select primary and standby communication paths. Specifically, the process illustrated in FIG. 3 may be used to balance primary and standby paths between multiple equal cost paths.

The process of FIG. 3 is similar to the process of FIG. 2 in that it begins in step 305 where a network device determines a plurality of paths through a network from a source device to a destination device. For example, a path computation element, such as PCE 115 of FIG. 1, may calculate a plurality of disjoint, equal cost paths from source network device 100 of FIG. 1 to destination network device 105 of FIG. 1.

In step 310, a minimum vacant bandwidth is calculated for each of the plurality of equal cost paths. The minimum vacant bandwidth is the value of the vacant bandwidth for the network link in the path that has the lowest vacant bandwidth value. The minimum vacant bandwidth can be viewed as the "weakest link" in the network path, or the network link that can handle the least amount of additional traffic. To use paths 120 an example, the vacant minimum bandwidth will be the lowest of the vacant bandwidth values for network links 132a, 132b and 132c. Similarly, the minimum vacant bandwidth for path 125 will be the lowest of the vacant bandwidth values for network links 132d, 132e and 132f. In step 315, the path from the plurality of equal cost paths having the highest minimum vacant bandwidth will be selected as the primary path, while in step 320, the path having the lowest minimum vacant bandwidth is selected as the standby path.

In step 325 a determination is made as to whether or not additional paths need to be assigned. If more paths need to be assigned, the process returns to step 310. If there are no more paths to be assigned, the process ends at step 330.

Figure 4:
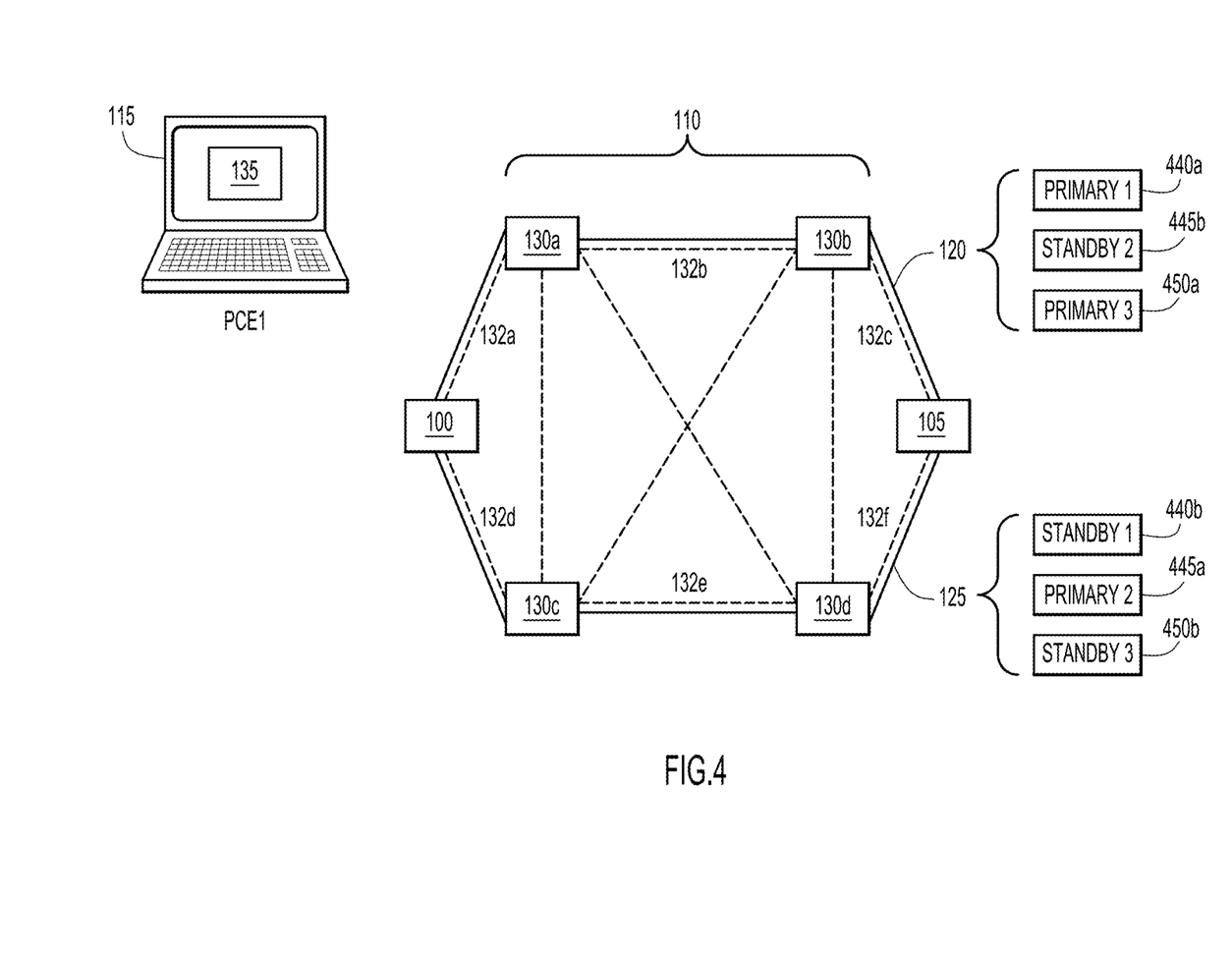
FIG. 4 illustrates an example of a network environment in which the process of FIG. 3 is implemented.

Turning to FIG. 4, depicted therein is a network environment similar to that of FIG. 1, but that includes the assignment of primary and standby paths according to a process like that of FIG. 3. For the purposes of this example, network path 120 and network path 125 are equal cost, disjoint paths through network 110. Also for the purposes of this example, PCE 115 needs to establish three communication paths for communication between network device 100 and network device 105, each of which requires 1 Gb of bandwidth. Finally, the links of the network paths have the following bandwidth allocations prior to PCE 115 assigning the additional paths:

| Path | Link | Total Bandwidth | Assigned Primary | Assigned Standby |
|---|---|---|---|---|
| Path 120 | 132a | 10 Gb | 1 Gb | 4 Gb |
|  | 132b | 10 Gb | 0 Gb | 0 Gb |
|  | 132c | 10 Gb | 0 Gb | 0 Gb |
| Path 125 | 132d | 10 Gb | 0 Gb | 0 Gb |
|  | 132e | 10 Gb | 2 Gb | 2 Gb |
|  | 132f | 10 Gb | 0 Gb | 0 Gb |

For path 120, vacant bandwidth calculation module 135 will calculate the following vacant bandwidths for each link in paths 120 and 125.

Vacant Bandwidth for Link 132a=(10−(4+1))+4=9;

The value "10" is the value of the total bandwidth that the link can handle, "10−(4+1)" is the available bandwidth, and "4" is the bandwidth assigned to standby paths. The calculations for the other links are as follows:

Vacant Bandwidth for Link 132b=(10−0)+0=10;

Vacant Bandwidth for Link 132c=(10−0)+0=10;

With these values calculated, the minimum vacant bandwidth for path 120 would be the minimum value of the set of values {9, 10, 10}. Therefore, the minimum vacant bandwidth for path 120 would be "9." Performing similar calculations for path 125 results in the following values:

Vacant Bandwidth for Link 132$d$=(10−0)+0=10;

Vacant Bandwidth for Link 132$e$=(10−(2+2))+2=8;

Vacant Bandwidth for Link 132$f$=(10−0)+0=10;

Accordingly, the minimum vacant bandwidth for path 125 is 8. Therefore, when step 315 of FIG. 3 is performed for the network environment of FIG. 4, the primary path is assigned to path 120 because path 120 has a higher minimum vacant bandwidth than path 125 (i.e. "9," the minimum vacant bandwidth for path 120, is greater than "8," the minimum vacant bandwidth of path 125).

In addition to calculating the vacant bandwidth, the PCE 115 may also calculate the minimum available bandwidth for each of the equal cost paths to ensure that the path having the highest minimum vacant bandwidth also has enough available bandwidth to accommodate the assignment of a new primary or standby path. The available bandwidth for each link in path 120 would be calculated as follows:

Available Bandwidth for Link 132$d$=10−(4+1)=5;

Available Bandwidth for Link 132$e$=10−(0+0)=10;

Available Bandwidth for Link 132$f$=10−(0+0)=10;

As the minimum vacant bandwidth for path 120 is 5, and therefore, path 120 can accommodate the addition of a 1 GB primary path. Accordingly, the assignment of the primary path to path 120 is carried out.

When step 320 of the process of FIG. 3 assigns the standby path, the standby path will be assigned to path 125 because path 125 has the lower minimum vacant available bandwidth, as shown through assignments 440$a$ and 440$b$ of FIG. 4.

After assignment of the first new path, path 120 and path 125 will have the following bandwidth allocations:

| Path | Link | Total Bandwidth | Assigned Primary | Assigned Standby |
|---|---|---|---|---|
| Path 120 | 132a | 10 GB | 2 GB | 4 GB |
|  | 132b | 10 GB | 1 GB | 0 GB |
|  | 132c | 10 GB | 1 GB | 0 GB |
| Path 125 | 132d | 10 GB | 0 GB | 1 GB |
|  | 132e | 10 GB | 2 GB | 3 GB |
|  | 132f | 10 GB | 0 GB | 1 GB |

When PCE 115 goes to assign the second path, vacant bandwidth calculation module 135 will perform the following calculations for path 120:

Vacant Bandwidth for Link 132$a$=(10−(4+2))+4=8;

Vacant Bandwidth for Link 132$b$=(10−1)+0=9;

Vacant Bandwidth for Link 132$c$=(10−1)+0=9;

Accordingly, the minimum vacant bandwidth for path 120 is determined to be "8." For path 125, the calculations are as follows:

Vacant Bandwidth for Link 132$d$=(10−(0+1))+1=10;

Vacant Bandwidth for Link 132$e$=(10−(2+3))+3=8;

Vacant Bandwidth for Link 132$f$=(10−(0+1))+1=10;

Accordingly, the minimum vacant bandwidth for path 125 is also determined to be "8."

Since both path 120 and path 125 have the same minimum vacant bandwidth, PCE 115 is configured to apply a "tie breaker" to determine which path receives the primary path and which receives the standby path. According to the present example, PCE 115 determines the minimum available bandwidth for each path and assigns the primary path to the path having the highest minimum available bandwidth and assigns the standby path to the path having the lowest minimum available bandwidth.

The available bandwidths for each link in path 120 are as follows:

Available Bandwidth for Link 132$b$=10−(4+2)=4;

Available Bandwidth for Link 132$a$=10−1=9;

Available Bandwidth for Link 132$c$=10−1=9;

Accordingly, the minimum available bandwidth for path 120 is 4 GB. The available bandwidths for each link in path 125 are as follows:

Available Bandwidth for Link 132$d$=10−(0+1)=9;

Available Bandwidth for Link 132$e$=10−(2+3)=5;

Available Bandwidth for Link 132$f$=10−(0+1)=10;

Accordingly, the minimum available bandwidth for path 125 is 5 GB. Because path 125 has the higher minimum available bandwidth, the tie-breaker determines that the path 125 is assigned as the primary path for the second communication path, and path 120 is assigned as the standby path for the second communication path, as shown through assignments 445$a$ and 445$b$ of FIG. 4.

According to another example tie-breaker, when two paths share the same minimum vacant bandwidth, PCE 115 may look to the next lowest minimum vacant bandwidth when assigning the primary and standby paths. The next lowest minimum vacant bandwidth is the second lowest value of the available bandwidth plus standby reserve bandwidth for network links in each path in the plurality of paths. Path 125 has a next lowest minimum vacant bandwidth of 10 (the vacant bandwidth for either of links 132$d$ of 132$f$) and path 120 has a next lowest minimum vacant bandwidth of 9 (the vacant bandwidth for either of links 132$b$ of 132$c$). According to this example tie-breaker, path 125 will be selected as the primary path as it has the highest next lowest minimum vacant bandwidth and path 120 will be selected for the standby path as it has the lowest next lowest minimum vacant bandwidth. While this tie-breaker results in a different assignment than what is illustrated in FIG. 4, so long as one of the two described tie-breakers is consistently used, a balanced assignment of primary and stand-by paths may be achieved.

Using the first tie-breaker described above, and the assignments illustrated in FIG. 4, after assignment of the second new path, path 120 and path 125 will have the following bandwidth allocations:

| Path | Link | Total Bandwidth | Assigned Primary | Assigned Standby |
|---|---|---|---|---|
| Path 120 | 132a | 10 GB | 2 GB | 5 GB |
|  | 132b | 10 GB | 1 GB | 1 GB |
|  | 132c | 10 GB | 1 GB | 1 GB |

-continued

| Path | Link | Total Bandwidth | Assigned Primary | Assigned Standby |
|---|---|---|---|---|
| Path 125 | 132d | 10 GB | 1 GB | 1 GB |
|  | 132e | 10 GB | 3 GB | 3 GB |
|  | 132f | 10 GB | 1 GB | 1 GB |

When PCE 115 goes to assign the third new path, vacant bandwidth calculation module 135 will perform the following calculations for path 120:

Vacant Bandwidth for Link 132$a$=(10−(5+2))+5=8;

Vacant Bandwidth for Link 132$b$=(10−(1+1))+1=9;

Vacant Bandwidth for Link 132$c$=(10−(1+1))+1=9;

Accordingly, the minimum vacant bandwidth for path 120 is determined to be "8."

For path 125, the calculations are as follows:

Vacant Bandwidth for Link 132$d$=(10−(1+1))+1=9;

Vacant Bandwidth for Link 132$e$=(10−(3+3))+3=7;

Vacant Bandwidth for Link 132$f$=(10−(1+1))+1=9;

Accordingly, the minimum vacant bandwidth for path 125 is determined to be "7." Therefore, the primary path is assigned to path 120 because path 120 has a higher minimum vacant bandwidth than path 125, and the standby path will be assigned to path 125 as path 125 has the lower minimum vacant available bandwidth, as shown through assignments 450$a$ and 450$b$ of FIG. 4.

As illustrated through this example, vacant bandwidth calculation module 135 allows PCE 115 to split the primary and standby paths between path 120 and path 125. This provides a good balance between path 120 and path 125. For example, if path 120 experiences a failure, only some of the communication paths will need to be transferred to their standby path. Similarly, if path 125 experiences a failure, only some of the paths will need to transferred. By evenly distributing the primary and standby paths the possibility of congestion during peak times or during primary traffic bursts may be reduced.

If, on the other hand, PCE 115 always assigns the primary path to the path having the lowest available bandwidth, all of the primary paths would be assigned to path 125, while all of the standby paths would have been assigned to path 120. This may be an acceptable result when there are no problems along path 125. But, if path 125 were to experience a failure, all of the primary paths would need to be switched over to their standby paths. Switching all of the primary paths may require excessive processing which may result in higher traffic loss. Similarly, during high traffic times or during a burst of primary traffic, the primary paths may experience congestion and the associated drop in performance.

Figure 5:
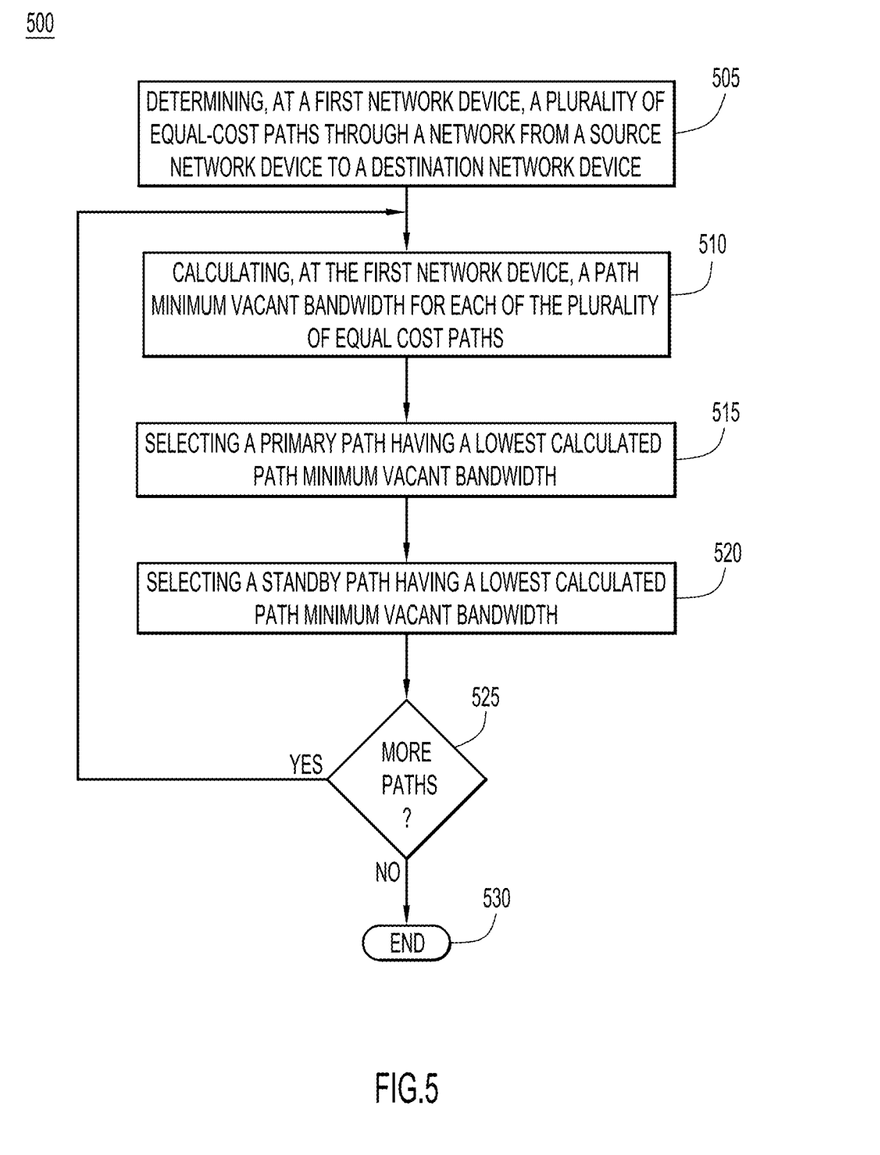
FIG. 5 is a flowchart of a process in which standby bandwidth aware path computation is used to provide a maximum filling of possible communication paths.

With reference now made to FIG. 5, depicted therein is a flowchart 500 illustrating another example process that utilizes vacant bandwidth, but applies the vacant bandwidth in a way that allows a path computation element to apply a maximum filling algorithm to a network environment like the environment of FIG. 1.

The process of FIG. 5 is similar to the process of FIG. 2 in that it begins in step 505 where a network device determines a plurality of paths through a network from a source device to a destination device. For example, a path computation element, such as PCE 115 of FIG. 1, may calculate a plurality of equal cost paths from source network device 100 of FIG. 1 to destination network device 105 of FIG. 1.

In step 510, a minimum vacant bandwidth is calculated for each of the plurality of equal cost paths. In step 515, the path from the plurality of equal cost paths having the lowest minimum vacant bandwidth will be selected as the primary path. Step 520 also assigns the standby path to the path having the lowest minimum vacant. By assigning both the primary and standby paths to the path having the lowest minimum vacant bandwidth, the path computation element can ensure that a single path is completely full before moving on to the next path.

In step 525 a determination is made as to whether or not additional paths need to be assigned. If more paths need to be assigned, the process returns to step 510. If there are no more paths to be assigned, the process ends at step 530.

Figure 6:
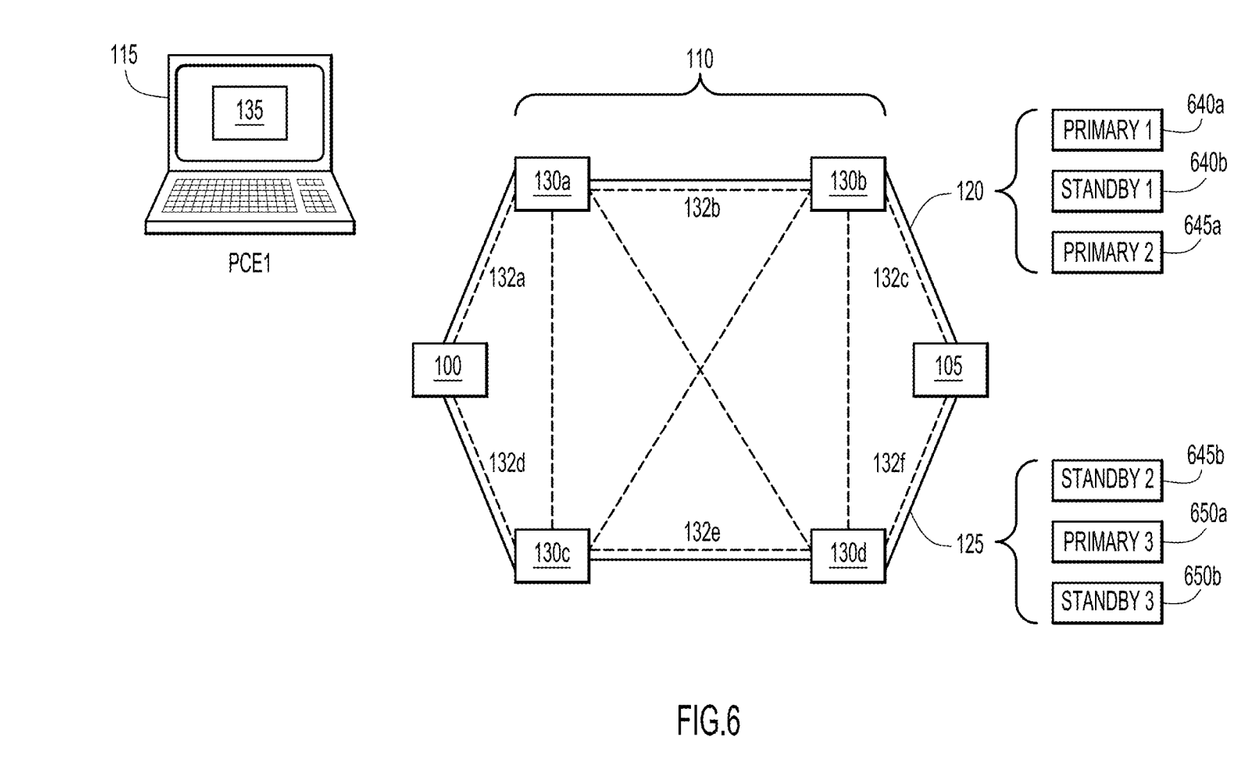
FIG. 6 illustrates an example of a network environment in which the process of FIG. 5 is implemented.

Turning to FIG. 6, depicted therein is a network environment similar to that of FIG. 1, but that includes the assignment of primary and standby paths according to a process like that of FIG. 5. For the purposes of this example, network path 120 and network path 125 are equal cost, disjoint paths through network 110. Also for the purposes of this example, PCE 115 needs to establish three communication paths for communication between network device 100 and network device 105, each of which requires 1 GB of bandwidth. Finally, the links of the network paths have the following bandwidth allocations prior to PCE 115 assigning any paths:

| Path | Link | Total Bandwidth | Assigned Primary | Assigned Standby |
|---|---|---|---|---|
| Path 120 | 132a | 10 GB | 7 GB | 0 GB |
|  | 132b | 10 GB | 0 GB | 0 GB |
|  | 132c | 10 GB | 0 GB | 0 GB |
| Path 125 | 132d | 10 GB | 0 GB | 0 GB |
|  | 132e | 10 GB | 0 GB | 0 GB |
|  | 132f | 10 GB | 0 GB | 0 GB |

For path 120, vacant bandwidth calculation module 135 will calculate the following vacant bandwidths for each link in paths 120 and 125.

Vacant Bandwidth for Link 132$b$=(10−(7+0))+0=3;

Where "10" is the value of the total bandwidth the link can handle, "10−(7+0)" is the available bandwidth, and "0" is the bandwidth assigned to standby paths. The calculations for the other links are as follows:

Vacant Bandwidth for Link 132$a$=(10−(0+0))+0=10;

Vacant Bandwidth for Link 132$c$=(10−(0+0))+0=10;

With these values calculated, the minimum vacant bandwidth for path 120 would be the minimum value of the set {3, 10, 10}. Therefore, the minimum vacant bandwidth for path 120 would be "3." Performing similar calculations for path 125 results in the following values:

Vacant Bandwidth for Link 132$d$=(10−(0+0))+0=10;

Vacant Bandwidth for Link 132$e$=(10−(0+0))+0=10;

Vacant Bandwidth for Link 132$f$=(10−(0+0))+0=10;

When step 515 of FIG. 5 is performed for the network environment of FIG. 6, the primary path is assigned to path 120 because path 120 has a lower minimum vacant bandwidth than path 125. Specifically, minimum vacant bandwidth for path 120 is 3, while the minimum vacant bandwidth for path 125 is 10. Similarly, when step 520 of the process of FIG. 5 assigns the standby path, the standby path will also be assigned to path 120 as path 120 has the lower minimum vacant available bandwidth, as shown through assignments 640*a* and 640*b* of FIG. 4.

Therefore, after assignment of the first new path, path 120 and path 125 will have the following bandwidth allocations:

| Path | Link | Total Bandwidth | Assigned Primary | Assigned Standby |
|---|---|---|---|---|
| Path 120 | 132a | 10 GB | 8 GB | 1 GB |
|  | 132b | 10 GB | 1 GB | 1 GB |
|  | 132c | 10 GB | 1 GB | 1 GB |
| Path 125 | 132d | 10 GB | 0 GB | 0 GB |
|  | 132e | 10 GB | 0 GB | 0 GB |
|  | 132f | 10 GB | 0 GB | 0 GB |

When PCE 115 goes to assign the second path, vacant bandwidth calculation module 135 will perform the following calculations for path 120:

Vacant Bandwidth for Link 132$b$=(10−(8+1))+1=2;

Vacant Bandwidth for Link 132$a$=(10−(1+1))+1=9;

Vacant Bandwidth for Link 132$c$=(10−(1+1))+1=9;

Accordingly, the minimum vacant bandwidth for path 120 is determined to be "2." For path 125, the calculations are as follows:

Vacant Bandwidth for Link 132$d$=(10−(0+0))+0=10;

Vacant Bandwidth for Link 132$e$=(10−(0+0))+0=10;

Vacant Bandwidth for Link 132$f$=(10−(0+0))+0=10;

Accordingly, the minimum vacant bandwidth for path 125 is determined to be "10."

When step 515 of FIG. 5 is performed for the second new path, the primary path is once again assigned to path 120 because path 120 has a lower minimum vacant bandwidth than path 125, as illustrated by assignment 645*a*. But, before assignment of the standby path may be carried out, vacant bandwidth calculation module 135 first checks to see that there is available bandwidth for the assignment of the second standby path. Accordingly, vacant bandwidth calculation module 135 calculates the available bandwidth for each link in path 120.

Available Bandwidth for Link 132$b$=10−(9+1)=0;

Available Bandwidth for Link 132$a$=10−(2+1)=8;

Available Bandwidth for Link 132$c$=10−(2+1)=8;

Because link 132 does not have any available bandwidth left, it is no longer eligible to receive additional paths, and therefore, standby path 2, is assigned to path 125, as illustrated by assignment 645*b*. Furthermore, because path 120 has been filled, when PCE 115 assigns the third new path, the primary path and the standby path will both be assigned to path 125, as illustrated by assignments 650*a* and 650*b*.

If the lowest path minimum vacant bandwidth comparison results in a tie, PCE 115 may compare the next lowest minimum vacant bandwidth when applying the maximum filling algorithm. For example, if two network paths have the same minimum vacant bandwidth, PCE 115 may fill the path having the lower next lowest minimum vacant bandwidth first.

Figure 7:
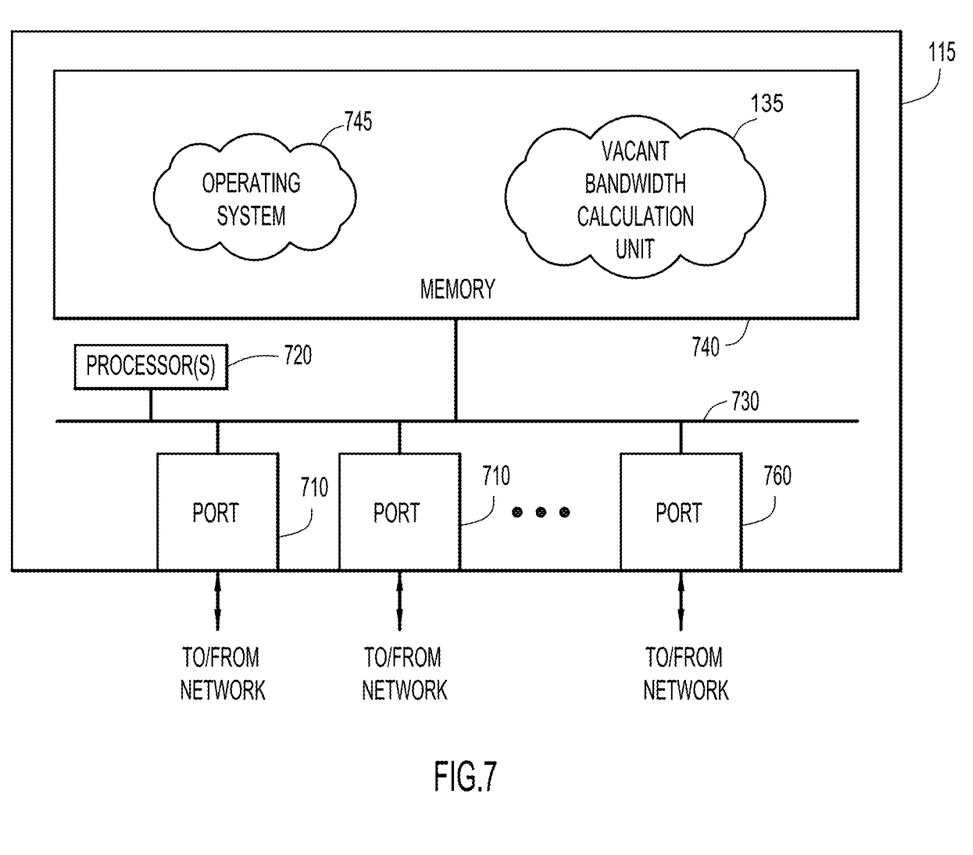
FIG. 7 is an example block diagram of a device configured to provide standby bandwidth aware path computation.

Turning now to FIG. 7, depicted therein is an example block diagram of a network device, e.g., stateful network device 115 (e.g. a PCE), configured to perform the techniques described herein in connection with FIGS. 1-6. The stateful network device 115 comprises one or ports 710 to enable communication over a network, processor(s) 720, bus 730, and memory 740. The memory 740 contains software instructions for operating system 745 and vacant bandwidth calculation module 135.

Memory 740 may comprise read only memory (ROM), random access memory (RAM), magnetic disk storage media devices, optical storage media devices, flash memory devices, electrical, optical, or other physical/tangible (e.g., non-transitory) memory storage devices. The processor 720 is, for example, a microprocessor or microcontroller that executes instructions for stateful network device 115. Thus, in general, the memory 740 may comprise one or more tangible (non-transitory) computer readable storage media (e.g., a memory device) encoded with software comprising computer executable instructions and when the software is executed (by the processor 720), and in particular the instructions for the vacant bandwidth calculation module 135, it is operable to perform the operations described herein in connection with FIGS. 1-6. Specifically, vacant bandwidth calculation module 135 includes instructions that allow processor 720 provide standby bandwidth aware path computation as described herein.

While the techniques illustrated and described herein are embodied in one or more specific examples, it is nevertheless not intended to be limited to the details shown, since various modifications and structural changes may be made therein without departing from the scope and range of equivalents of the claims.

What is claimed is:

1. A method comprising: determining, at a first network device, a plurality of paths through a network from a source network device to a destination network device; calculating, at the first network device, a vacant bandwidth for each network link of each path of the plurality of paths, wherein the vacant bandwidth is a value of unbound available bandwidth plus standby reserve bandwidth for the network link; calculating, at the first network device, a minimum vacant bandwidth for each path of the plurality of paths, wherein the minimum vacant bandwidth is the smallest vacant bandwidth value for the network links of each path; selecting, at the first network device, a primary path from the plurality of paths based on the minimum vacant bandwidth calculated for each path of the plurality of paths; and selecting, at the first network device, a standby path from the plurality of paths based on the minimum vacant bandwidth calculated for each path of the plurality of paths; reserving resources along the primary path based on the minimum vacant bandwidth calculated for each path of the plurality of paths; and reserving resources along the standby path based on the minimum vacant bandwidth calculated for each path of the plurality of paths.

2. The method of claim 1, wherein determining the plurality of paths comprises calculating a plurality of disjoint paths.

3. The method of claim 1, wherein determining the plurality of paths comprises calculating a plurality of label switched paths.

4. The method of claim 1, wherein determining, at the first network device, the plurality of paths comprises determining the plurality of paths at a stateful path computation element.

5. The method of claim 1 wherein: selecting the primary path comprises selecting a path of the plurality of paths having a highest calculated minimum vacant bandwidth; and selecting the standby path comprises selecting a path of the plurality of paths having a lowest calculated minimum vacant bandwidth.

6. The method of claim 5, further comprising calculating the minimum available bandwidth for each of the plurality of paths, wherein the minimum available bandwidth is a minimum value of unbound bandwidth for network links in each path in the plurality of paths.

7. The method of claim 6, wherein selecting the primary path comprises selecting the primary path from a plurality of paths having an equal minimum vacant bandwidths such that the selected primary path has a highest minimum available bandwidth of the plurality of paths having an equal minimum vacant bandwidth.

8. The method of claim 6, wherein selecting the standby path comprises selecting the standby path from a plurality of paths having an equal minimum vacant bandwidth such that the selected standby path has a highest minimum available bandwidth of the plurality of paths having an equal minimum vacant bandwidth.

9. The method of claim 5, further comprising: reserving resources along the primary path and the standby path; recalculating, after reserving resources along the primary and the standby path, a second minimum vacant bandwidth for each of the plurality of paths; selecting a second primary path from the plurality of equal-cost paths such that the second primary path has a highest value of the calculated second minimum vacant bandwidth; and selecting a second standby path from the plurality of paths such that the second standby path has a lowest value of the calculated second minimum vacant bandwidth.

10. The method of claim 9, wherein: selecting the second primary path comprises selecting a path of the plurality of paths that is different from the primary path; and selecting the second standby path comprises selecting a path of the plurality of paths that is different from the standby path.

11. The method of claim 1, wherein selecting the primary path comprises selecting a path of the plurality of paths having the lowest calculated minimum vacant bandwidth; and selecting the standby path comprises selecting a path of the plurality of paths having the lowest calculated minimum vacant bandwidth.

12. The method of claim 1, wherein the plurality of paths comprises a plurality of equal-cost paths.

13. The method of claim 1, wherein selecting the primary path and selecting the standby path comprises: determining that each of the plurality of paths has an equal minimum vacant bandwidth; calculating a next lowest minimum vacant bandwidth for each path in the plurality of paths, wherein the next lowest minimum vacant bandwidth is the second lowest value of the vacant bandwidth for the network links in each path in the plurality of paths; selecting the primary path as a path of the plurality of paths having the highest calculated next lowest minimum vacant bandwidth; and selecting the standby path as a path of the plurality of paths having the lowest calculated next lowest minimum vacant bandwidth.

14. An apparatus comprising: at least one network interface unit configured to enable network communications; and a processor coupled to the network interface unit, wherein the processor is configured to:
determine a plurality of paths through a network from a source network device to a destination network device;
calculate a vacant bandwidth for each network link of each path of the plurality of paths, wherein the vacant bandwidth is a value of unbound bandwidth plus standby reserve bandwidth for the network link;
calculate a minimum vacant bandwidth for each path of the plurality of paths, wherein the minimum vacant bandwidth is the smallest vacant bandwidth value for the network links of each path;
select a primary path from the plurality of paths based on the minimum vacant bandwidths calculated for each path of the plurality of paths; and
select a standby path from the plurality of paths based on the minimum vacant bandwidths calculated for each path of the plurality of paths;
reserve resources along the primary path based on the minimum vacant bandwidth calculated for each path of the plurality of paths; and
reserving resources along the standby path based on the minimum vacant bandwidth calculated for each path of the plurality of paths.

15. The apparatus of claim 14, wherein the processor is further configured to: select as the primary path a path of the plurality of paths having a highest calculated minimum vacant bandwidth; and select as the standby path a path of the plurality of paths having the lowest calculated minimum vacant bandwidth.

16. The apparatus of claim 14, wherein the processor is further configured to: select as the primary path a path of the plurality of paths having a lowest calculated minimum vacant bandwidth; and select as the standby path a path of the plurality of paths having a lowest calculated minimum vacant bandwidth.

17. A tangible, non-transitory computer readable medium comprising instructions that when executed by a processor cause the processor to: determine a plurality of paths through a network from a source network device to a destination network device; calculate a vacant bandwidth for each network link of each path of the plurality of paths, wherein the vacant bandwidth is a value of unbound bandwidth plus standby reserve bandwidth for the network link; calculate a minimum vacant bandwidth for each path of the plurality of paths, wherein the minimum vacant bandwidth is the smallest vacant bandwidth value for the network links of each path; select a primary path from the plurality of paths based on the minimum vacant bandwidths calculated for each path of the plurality of paths; a standby path from the plurality of based on the minimum vacant bandwidths calculated for each path of the plurality of paths; reserve resources along the primary path based on the minimum vacant bandwidth calculated for each path of the plurality of paths; and reserving resources along the standby path based on the minimum vacant bandwidth calculated for each path of the plurality of paths.

18. The computer readable medium of claim 17, wherein the instructions further cause the processor to: select as the primary path a path of the plurality of paths having a highest calculated minimum vacant bandwidth; and select as the standby path a path of the plurality of paths having the lowest calculated minimum vacant bandwidth.

19. The computer readable medium of claim 17, wherein the instructions further cause the processor to: select as the primary path a path of the plurality of paths having a lowest calculated minimum vacant bandwidth; and select as the standby path a path of the plurality of paths having the lowest calculated minimum vacant bandwidth.

20. The apparatus of claim 15, wherein the processor is further configured to: recalculate, after reserving resources along the primary and the standby path, a second minimum vacant bandwidth for each of the plurality of paths; select a second primary path from the plurality of equal-cost paths such that the second primary path has a highest value of the calculated second minimum vacant bandwidth; and select a second standby path from the plurality of paths such that the second standby path has a lowest value of the calculated second minimum vacant bandwidth.

\* \* \* \* \*

UNITED STATES PATENT AND TRADEMARK OFFICE
CERTIFICATE OF CORRECTION

PATENT NO. : 9,450,858 B2
APPLICATION NO. : 14/067023
DATED : September 20, 2016
INVENTOR(S) : Tarek Saad et al.

It is certified that error appears in the above-identified patent and that said Letters Patent is hereby corrected as shown below:

In the Claims

In Column 10, Line 45, Claim 1 delete "available".

Signed and Sealed this
Twenty-seventh Day of March, 2018

Andrei Iancu
*Director of the United States Patent and Trademark Office*